US012492969B2

(12) United States Patent
Park et al.

(10) Patent No.: US 12,492,969 B2
(45) Date of Patent: Dec. 9, 2025

(54) STAGE ASSEMBLY WITH VENT STRUCTURE FOR PREVENTING CONDENSATION

(71) Applicant: CURIOSIS CO., LTD, Seoul (KR)

(72) Inventors: Young Ho Park, Anyang-si (KR); Sung Eun An, Incheon (KR); Bong Woo Kim, Seoul (KR)

(73) Assignee: CURIOSIS CO., LTD, Seoul (KR)

( * ) Notice: Subject to any disclaimer, the term of this patent is extended or adjusted under 35 U.S.C. 154(b) by 0 days.

(21) Appl. No.: 18/016,045

(22) PCT Filed: Feb. 25, 2022

(86) PCT No.: PCT/KR2022/002816
§ 371 (c)(1),
(2) Date: Jan. 13, 2023

(87) PCT Pub. No.: WO2023/158006
PCT Pub. Date: Aug. 24, 2023

(65) Prior Publication Data
US 2024/0302252 A1    Sep. 12, 2024

(30) Foreign Application Priority Data
Feb. 16, 2022 (KR) .................. 10-2022-0020047

(51) Int. Cl.
*G02B 21/28* (2006.01)
*G01N 1/28* (2006.01)

(52) U.S. Cl.
CPC .............. *G01N 1/28* (2013.01); *G02B 21/28* (2013.01)

(58) Field of Classification Search
CPC ......... G02B 21/24; G02B 21/28; G02B 21/30
See application file for complete search history.

(56) References Cited

U.S. PATENT DOCUMENTS 1,609,129 A * 11/1926 Roberts .................. G02B 21/30
359/395
3,472,726 A * 10/1969 Scheidegger .......... G02B 21/30
359/395
(Continued)

FOREIGN PATENT DOCUMENTS

EP       2037137 B1 *  7/2013 ......... G03F 7/70716
JP   2006174828 A  *  7/2006 ............ C12M 41/14
(Continued)

OTHER PUBLICATIONS

[Supportive Materials for Exception to Loss of Novelty] Curiosis Inc., Automated live cell imaging system—Cellogen Nano, Instructional Manual, published 2021, Seoul, Korea, 47 pages, cited in NPL No. 3.
(Continued)

*Primary Examiner* — Herbert K Roberts
(74) *Attorney, Agent, or Firm* — Dinsmore & Shohl LLP; Yongsok Choi, Esq.

(57) ABSTRACT

The present invention relates to a stage assembly with a vent structure for preventing condensation by making a flow path in the stage so that air around the vessel on the stage passes through the inside of the equipment for making the temperature of a stage-direction surface of a vessel similar to the ambient temperature of the vessel to prevent condensation. In addition, the present invention relates to the stage assembly with the vent structure to reduce cost, prevent stenosis due to exposure of the drive, and improve antifouling function due to blocking of foreign substances, by simplifying the structure and reducing parts so that all drive parts can be mounted in a space smaller than the diameter of a knob for driving the stage, and applying a scotch yoke mechanism so that a rotary shaft connected to the knob per se is a drive to make a linear motion.

7 Claims, 8 Drawing Sheets

(56) References Cited

U.S. PATENT DOCUMENTS

| | | | | |
|---|---|---|---|---|
| 3,580,658 | A | * | 5/1971 | Swanson ................ G02B 21/34 359/395 |
| 3,701,580 | A | * | 10/1972 | Sobajima ............... G02B 21/28 359/395 |
| 3,969,013 | A | * | 7/1976 | Poty ....................... G02B 21/26 359/390 |
| 4,367,915 | A | * | 1/1983 | Georges ................ G02B 21/26 414/331.14 |
| 4,629,862 | A | * | 12/1986 | Kitagawa ............... C12M 41/12 359/395 |
| 5,257,128 | A | * | 10/1993 | Diller ..................... G02B 21/28 359/398 |
| 5,438,451 | A | * | 8/1995 | Schweizer ............. G02B 21/26 359/392 |
| 2017/0227752 | A1 | * | 8/2017 | Lihl ........................ G02B 21/28 |
| 2019/0317125 | A1 | * | 10/2019 | Ning ....................... G01Q 30/16 |
| 2022/0226829 | A1 | * | 7/2022 | Schulz ..................... B01L 5/00 |
| 2022/0308329 | A1 | * | 9/2022 | Christ ................... C12M 41/46 |
| 2023/0057023 | A1 | * | 2/2023 | Policelli ................ G02B 21/02 |

FOREIGN PATENT DOCUMENTS

| | | | | |
|---|---|---|---|---|
| JP | 3869938 B2 | * | 1/2007 | ......... G03F 7/70691 |
| KR | 10-0162318 B1 | | 12/1998 | |
| KR | 0162318 B1 | * | 12/1998 | ............. F16H 21/22 |
| KR | 101234604 B1 | * | 2/2013 | ............. H01J 37/20 |

OTHER PUBLICATIONS

[Supportive Materials for Exception to Loss of Novelty] Automated live cell imaging system—Cellogen Nano, YouTube (https://www.youtube.com/watch?v=sesG6wNSkFs) uploaded by Applicant (Curiosis Inc.), Sep. 9, 2021, 1 page, cited in NPL Nos. 3-4.

Korean Office Action issued on May 16, 2022, in connection with the Korean Patent Application No. 10-2022-0020047, 8 pages.

Korean Office Action issued on Nov. 13, 2022, in connection with the Korean Patent Application No. 10-2022-0020047, 8 pages.

* cited by examiner

STAGE ASSEMBLY WITH VENT STRUCTURE FOR PREVENTING CONDENSATION

CROSS-REFERENCE TO RELATED APPLICATION

The present application is a national stage filing under 35 U.S.C § 371 of PCT application number PCT/KR2022/002816 filed on Feb. 25, 2022 which is based upon and claims the benefit of priorities to Korean Patent Application No. 10-2022-0020047, filed on Feb. 16, 2022, in the Korean Intellectual Property Office. The disclosures of the above-listed applications are hereby incorporated by reference herein in their entireties.

TECHNICAL FIELD

The present invention relates to a stage assembly with a vent structure for preventing condensation. More particularly, the present invention relates to the stage assembly with the vent structure for preventing condensation by making a flow path in the stage so that air around the vessel on the stage passes through the inside of the equipment for making the temperature of a stage-direction surface of a vessel similar to the ambient temperature of the vessel to prevent condensation. In addition, the present invention relates to the stage assembly with the vent structure to reduce cost, prevent stenosis due to exposure of the drive, and improve antifouling function due to blocking of foreign substances, by simplifying the structure and reducing parts so that all drive parts can be mounted in a space smaller than the diameter of a knob for driving the stage, and applying a scotch yoke mechanism so that a rotary shaft connected to the knob per se is a drive to make a linear motion.

BACKGROUND

Generally, stages are utilized for a variety of purposes.

In particular, in case of stages used in live cell imaging equipment, dew condensation is generated in the vessel when the temperature of the vessel above the stage becomes uneven in each vessel site due to the temperature difference from the incubator.

This condensation interferes with cell observation when capturing an image.

For example, the inside of the incubator for cell culture is maintained at a temperature of 37° C. and a humidity of about 95%. Because of the very high humidity, however, condensation may occur on the surface of the product if there is a small temperature difference for each portion of the product inside the incubator.

Moreover, since the inside of the vessel containing culture fluid of cell is maintained at a higher humidity than the incubator, there is a very high probability of dew condensation occurring in the upper part of the vessel.

In this way, since elements that generate even a slightly higher temperature than the incubator are operated inside the equipment due to the characteristics of the equipment operated by the power source, the temperature of some space inside the equipment is different from the incubator temperature. In addition, the vessel above the stage is prone to condensation due to temperature differences in each vessel site because heat is transferred through the stage of the equipment or observation window.

Since dew condensation generated in the vessel adversely affects cell observation such as generation of a shadow in the cell background when capturing cell images, dew condensation should be prevented during the imaging period (for as long as a few weeks).

On the other hand, the stage is driven by various driving methods such as a rack-and-pinion gear type, a lead screw type or a ball screw type, a linear motor type, and a piezo type.

Thus, according to a drive source, the stage is classified into a manual stage in which an operator directly operates an instrument and an automatic stage operated with electric force.

In this case, the manual stage related to the present invention is mainly of a rack-and-pinion gear type capable of increasing the feed amount per rotation relative to the outer size.

For example, as shown in FIG. 1A, the rack-and-pinion gear type has an advantage that the transfer amount per rotation is relatively large. However, a space for a driving part outside the observation area is required since a rack-gear attachment space having a stroke length or longer is needed, and safety issues due to narrowing, foreign substance inflow, external contamination on contact, etc. occur due to the driving part is exposed to the outside (lower side).

Further, as shown in FIG. 1B, the lead screw or ball screw type is suitable for position control due to the low backlash and the small feed amount per rotation, but a screw attachment space having a stroke length or longer is required, and the parallelism between the drive part and the feed part affects the device operation as it is highly dependent on the dimensional accuracy and assembly accuracy.

In addition, as shown in FIG. 1C, the piezo type has an advantage of being able to accurately control a very small displacement movement in automatic control, but it has many limitations in use that the stroke length is too small (a few millimeters), the component cost is very high, and it is dedicated to automatic control.

Furthermore, as shown in FIG. 1D, the linear motor type has the advantage that high-speed and precise feeding is possible during automatic control, but it also has limitations that the size of the external controller therein is very large making it difficult to secure space, it is very expensive, and it is dedicated to automatic control.

(Patent Document 1) Korean Patent No. 10-1234604 (2013.02.13), a cryostage for electron probe micro analysis and observation of biological samples (Patent Document 2) Korean Patent No. 10-0162318 (1998.08.29), Scotch yoke type power transmission device

SUMMARY

Aspects of the present invention are to address at least the above-mentioned problems and/or disadvantages. Accordingly, the main purpose of the present invention is to provide a stage assembly with a vent structure for preventing condensation. According to the stage assembly of the present invention, condensation can be prevented by making a flow path on the stage so that air around the vessel on the stage passes through the inside of the equipment, thereby making the temperature of the stage-direction surface of the vessel similar to the vessel ambient temperature. In addition, by simplifying the structure and reducing parts so that all drive parts can be mounted in a space smaller than the diameter of a knob driving the stage, and applying a scotch yoke mechanism so that a rotary shaft connected to the knob per se is a drive to make a linear motion, the stage assembly of the present invention can reduce cost, prevent stenosis due to exposure of the drive, and improve antifouling function due to blocking of foreign substances.

As a means for obtaining the above purpose, the present invention provides a stage assembly having a vent structure for preventing condensation, characterized by comprising a base plate; a lower plate assembled on an upper surface of the base plate; an upper plate assembled on an upper surface of the lower plate; an intake passage recessed on an upper surface of the upper plate and provided to communicate with a central hole; and an intake fan installed inside a stage below the base plate and configured to suck outside air into the inside through the intake passage and release the air through a vent, and an adjustment knob disposed on one side of the upper plate. The adjustment knob can be assembled and installed to pass through the lower plate and the base plate, and the adjustment knob comprises: a lower knob for linearly moving the upper plate; and an upper node for simultaneously moving the upper plate and the lower plate in a direction perpendicular to a linear movement direction of the upper plate.

In this case, the intake passage has a shape of at least one selected from the group consisting of a cross shape, a horizontal straight shape, a vertical line shape, a curved shape, and a coil shape, or of a combination of at least two selected therefrom. In addition, the intake passage is characterized by having a U-shape, a V-shape or a semicircular shape based on a cross section.

In addition, a pair of slide holes are formed on both sides in the width direction of the base plate, and a base pin hole having a long hole shape in the width direction is formed on the base plate coinciding with a point where the adjustment knob is installed. On a lower surface of the lower plate, a slider that can be inserted into the slide hole and be moved is arranged; a through hole larger than the base pinhole and a lower pin hole extending vertically from the through hole are formed at a position corresponding to the base pin holes; and a pair of guide holes are formed to be perpendicular to the slider. On the lower surface of the upper plate, a protruding bar that can be inserted into the guide hole and moved is arranged; and a knob assembly hole and a pin active hole having an arc-shape are formed at a position coincident with the center of the hole at intervals (with a distance from each other). In addition, the stage assembly comprises an actuator penetrating the center of the lower knob and integrally fixed to the upper knob, wherein a lower pin fixed to the lower pin hole after passing through the pin active hole is formed on a lower surface of the lower knob, and a base pin fixed to the base pin hole after passing through the through hole is provided at a lower end of the actuator while being eccentric.

In addition, the base pin is eccentrically fixed to the lower end of the actuator.

In addition, a fixing hole is formed on the base plate, a sliding hole having a long hole shape in the longitudinal direction of the lower plate is formed at a position corresponding to the fixing hole of the lower plate, and a fixing device is bound to the fixing hole and the sliding hole.

In addition, a guide protrusion protrudes from the upper surface of the lower plate, and a guide groove having a long groove shape in a width direction of the upper plate is recessed in a lower surface at a position corresponding to the guide protrusion of the upper plate.

According to the present invention, the following effects can be obtained.

First, a flow path is made in the stage so that air around the vessel above the stage passes into the equipment and the temperature of the stage-direction surface of the vessel is similar to the temperature around the vessel to prevent condensation.

Second, the structure can be simplified so that all drive parts can be mounted in a space smaller than the diameter of the knob driving the stage.

Third, the number of parts can be reduced by simplifying the structure.

Fourth, by applying a scotch yoke mechanism, drive smoothness and efficiency can be achieved.

Fifth, the working effects such as the cost savings, the prevention of stenosis due to exposure of the driving device, and an antifouling effect due to blocking of foreign matters can be obtained.

BRIEF DESCRIPTION OF DRAWINGS

The above and other aspects, features, and advantages of certain embodiments of the disclosure will be more apparent from the following description taken in conjunction with the accompanying drawings, in which.

DETAILED DESCRIPTION

Figure 1A:
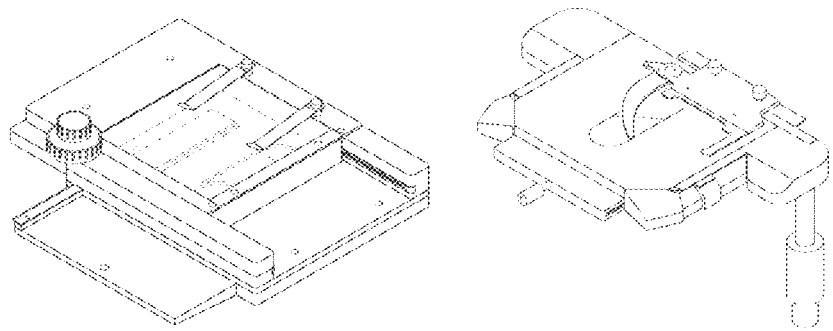
FIGS. 1A-1D are photographs of exemplary samples of a stage according to the prior art.
Figure 1B:
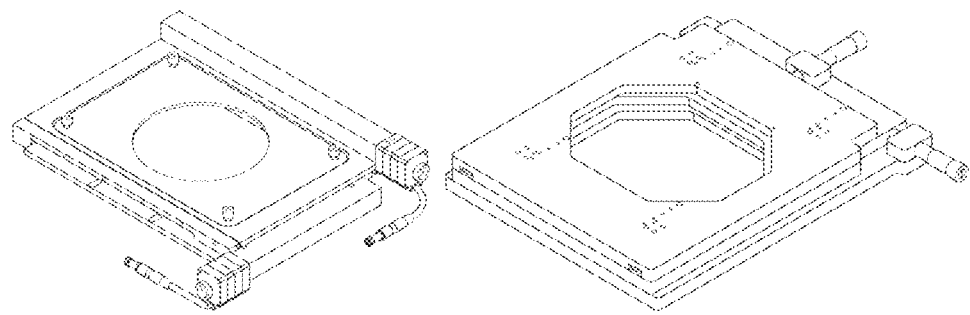
Figure 1C:
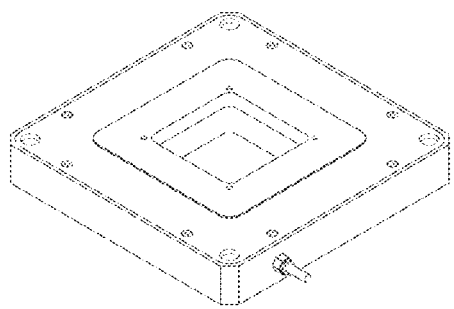
Figure 1D:
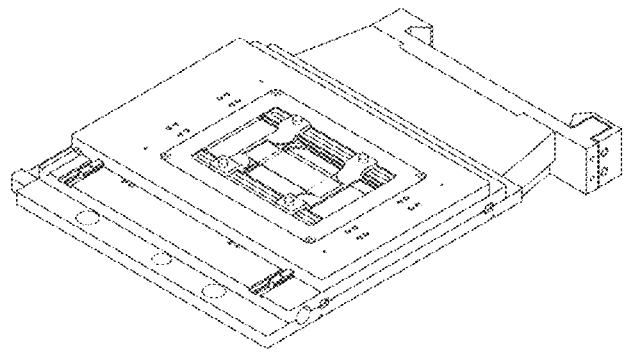
Figure 2:
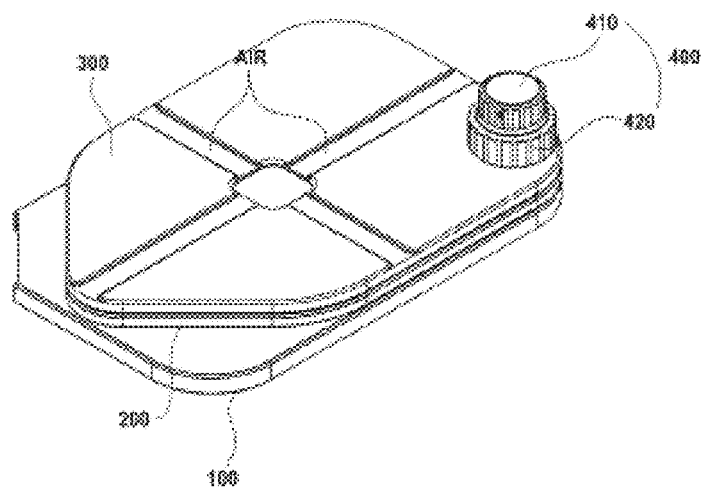
FIG. 2 is an exemplary perspective view of an assembly according to the present invention.

Hereinafter, the disclosure will be described in detail by explaining preferred embodiments of the present invention with reference to the accompanying drawings.

Before addressing the detailed description, it should be noted that the following specific structural or functional descriptions are merely illustrated for the purpose of describing an embodiment according to the present inventive concept, and the disclosure can be embodied in many different forms and should not be construed as being limited to the embodiments of the disclosure set forth herein. Particular implementations described herein merely correspond to embodiments of the disclosure and do not limit the scope of the disclosure in any way.

In addition, since embodiments according to the present invention may have various modifications and various forms, specific embodiments are illustrated in the drawings and described in detail herein. It should be understood, however, that they do not intend to limit embodiments according to the inventive concept to the particular disclosed forms, but to cover all modifications, equivalents, and alternatives falling within the spirit and scope of the invention.

The stage assembly with the vent structure for preventing condensation according to the present invention is configured to keep the temperature of each part of the vessel uniform in the incubator environment to such an extent that condensation does not occur.

For this, a flow path is generated in the stage such that air surrounding the vessel above the stage passes into the equipment, and a fan is operated for absorbing outside air and release it inside the equipment.

Thus, by keeping the temperature of the air flowing through the flow path on the surface facing the stage of the vessel similar to the temperature of the air on the other direction surface, it is possible to minimize the temperature difference between portions of the vessels and prevent dew condensation.

On the other hand, the stage according to the present invention is characterized in that it is designed to maintain a large feed per revolution relative to the external size, to minimize the size of the structure driving the stage, and to reduce the number of parts.

In other words, the rotation axis per se connected to the knob is designed to be a drive in such a way as to simplify the structure and reduce the components in order to put all the drive components in a space smaller than the knob diameter for driving the stage. For this, a Scotch yoke mechanism is applied in order for the axis of rotation connected to the knob to produce a linear motion.

In particular, when converting a rotational motion into a linear motion by applying the Scotch yoke mechanism, since the rate of change in linear motion per rotation angle is large in the front-rear rotation section where the direction of linear motion is switched, it is possible to minimize the sense of separation when the operator operates using the section with the smallest change.

In addition, the stage assembly is configured to reduce cost through structure simplification and eliminate safety problems associated with narrowing due to driving device exposure, foreign matter inflow problems, external contamination problems upon contact, and the like.

For example, while the guide portion on which the eccentric shaft that produces the relative movement of the stage touches is designed as a straight line, it is possible to change the feed distance per knob rotation angle by changing the guide shape.

That is, when the guide is designed as a straight line, the feed distance per rotation angle is smaller than the intermediate section of the knob rotation in the initial and final sections. Therefore, when the knob is rotated at a constant speed, the stage movement speed changes, so that the first section is slow, the intermediate section is fast, and the last section is again able to move at the same slow speed as in the first section.

This is a speed change that appears because the guide shape is a straight line. If the guide is designed with an appropriate curve, the rotation start angle of the eccentric shaft can be changed to properly accommodate the speed profile desired by the user.

In particular, the guide on which the eccentric shaft abuts can create friction between components. Thus, it is possible to increase product durability and precision by applying means for reducing friction (e.g., lubrication pads, graphite, bearings, etc.), wear resistant materials (e.g. carbides, etc.), wear-resistant coatings (e.g., Ti coatings, etc.) or heat treatment.

Further, the larger the eccentric shaft is located away from the center of the rotation axis, the greater the maximum stroke of the stage can be made. Thus, the eccentric shaft may be located outside the knob cross-sectional area to increase the stroke. However, since a large stroke is not required in a small space, it is advantageous for the eccentric shaft to be located in a space smaller than the knob cross-sectional area.

Therefore, the stage assembly according to the present invention can be widely used in the fields where a stage requiring acceleration and deceleration of linear motion with a constant rotation speed is needed, or where space occupied by drive components outside the stage should be minimized (circuit inspection equipment, various measurement equipment), etc.

Figure 3:
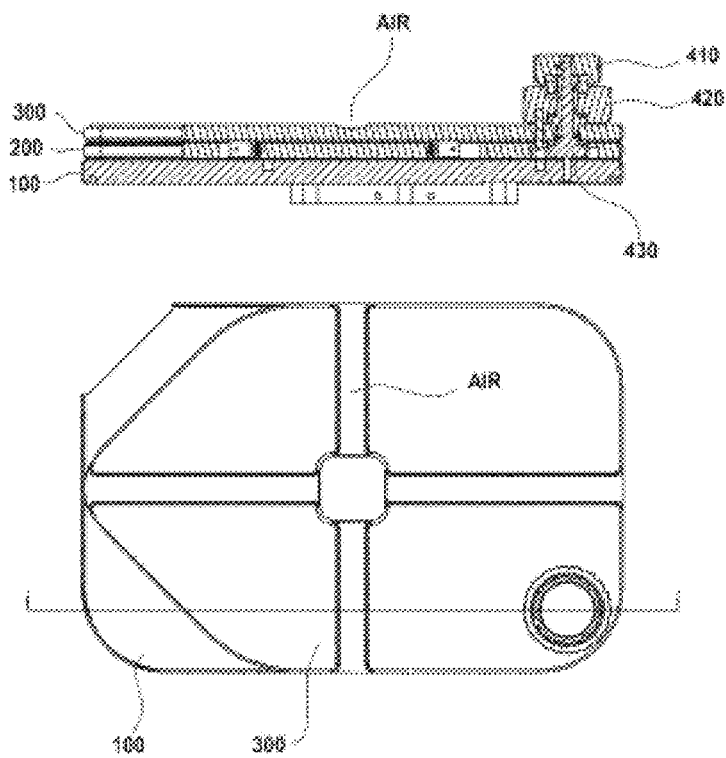
FIG. 3 is a sectional view of essential parts of an assembly according to the present invention.

More specifically, as illustrated in FIGS. 1A-1D and 2, a stage assembly with a vent structure for preventing condensation according to the present invention includes a base plate 100; a lower plate 200 assembled on an upper surface of the base plate 100; a upper plate 300 assembled on an upper surface of the lower plate 200; an intake passage (AIR) recessed on an upper surface of the upper plate 300 and provided to communicate with a central hole; an intake fan (FAN) (see FIG. 3, 4) installed inside the stage, which is a lower portion of the base plate 100, and configured to suck outside air into the interior through the intake passage and release the air through a vent; and an adjustment knob 400 arranged on one side of the upper plate 300 and assembled and installed to pass through the lower plate 200 and the base plate 100, wherein the adjustment knob 400 comprises: a lower knob 420 for linearly moving the upper plate 300; and an upper node 410 for simultaneously moving the upper plate 300 and the lower plate 200 in a direction perpendicular to an linear movement direction of the upper plate 300.

Figure 4:
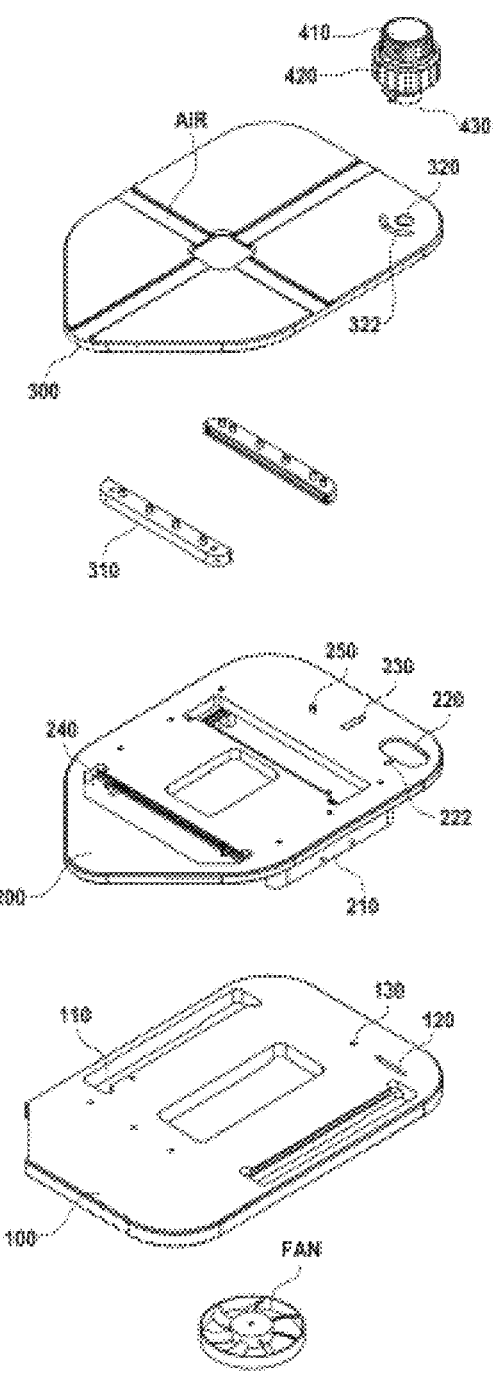
FIGS. 4 and 5 are exploded perspective views of an assembly from different angles according to the present invention.
Figure 5:
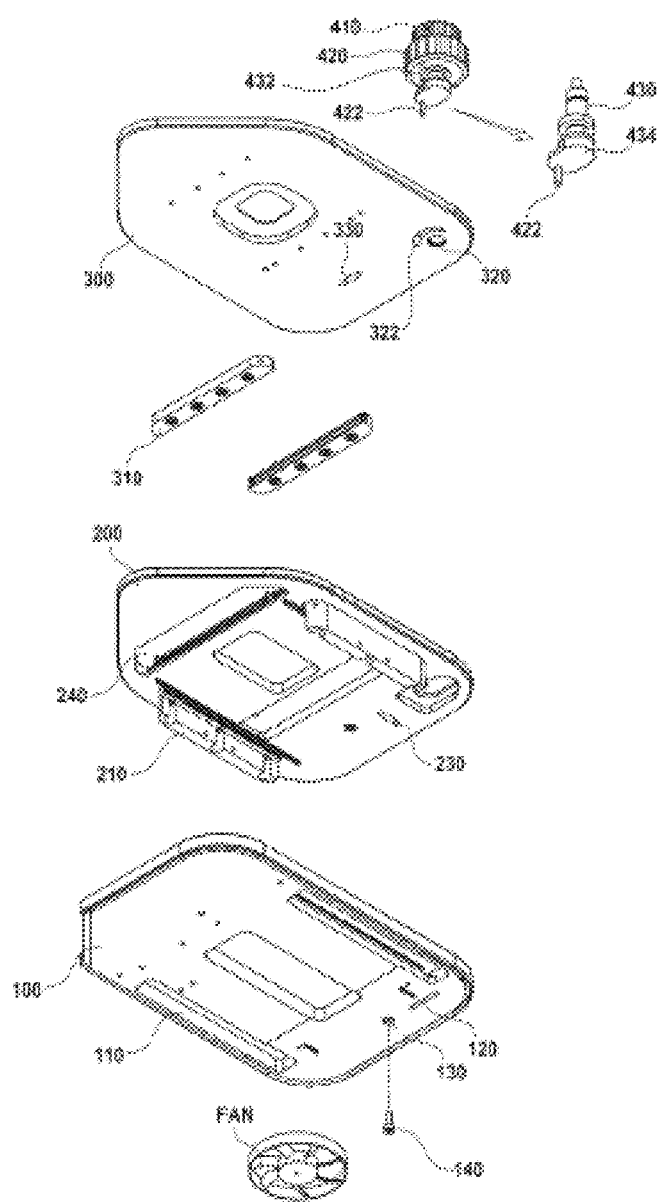

In this case, as illustrated in FIGS. 4 to 5, an intake fan (FAN) is installed in a lower portion of the base plate 100. The intake fan (FAN) is installed inside the equipment below the base plate 100, and a discharge port (not shown) is formed on the side of the equipment to discharge the outside air taken in by the intake fan (FAN).

Here, the intake passage (AIR) may have various shapes (one or a combination of two or more) including a cross shape, a horizontal straight line, a vertical line type, a curved shape, and a coil shape, and may also have a variety of shapes, such as a U-shape, a V-shape and a semicircular shape based on a cross section.

Therefore, in case a temperature deviation occurs, the air is taken in through the intake fan (FAN), and then the air flowing through the intake passage (AIR) minimizes the temperature difference on the sites of the equipment-direction surface of the vessel. After being taken in, the air is discharged to the outside through the outlet.

As a result, the temperature difference is reduced and the dew condensation phenomenon is suppressed, so that image defects due to dew condensation may not occur during cell observation or image capturing.

In particular, a pair of slide holes 110 are formed on both sides in the width direction of the base plate 100. The slide holes 110 are elongated in the longitudinal direction of the base plate 100.

Further, a base pin hole 120 having a long hole shape in the width direction is formed on the base plate 100 which coincides with the point where the adjustment knob 400 is installed.

In addition, a fixing hole 130 may be further formed at a distance from the base pinhole 120, and after the fixing device 140 is inserted into a sliding hole 230 to be described later, the fixing hole 130 can loosely fix the lower plate 200 so as not to be detached but to be slidable.

Further, a pair of sliders 210 are provided in the width direction on both sides of the lower surface of the lower plate 200, and the sliders 210 are configured to be fitted into the slide holes 110 and to be linearly movable along the slide holes.

In addition, a through hole 220, which is a relatively large oblong hole-shaped aperture, is formed at a position corresponding to the base pin hole 120.

In particular, a lower pin hole 222 having a predetermined length extending vertically from one side of the through hole 220 is further formed.

In addition, a sliding hole 230 in the form of an elongated hole long in the longitudinal direction of the lower plate 200 is formed at a point coincident with the fixing hole 130.

Accordingly, the fixing device 140 is fitted and fixed to the sliding hole 230, so that the lower plate 200 can move in a linear reciprocation within the width of the slide hole 230. This in turn equals to the width at which the slider 210 moves within the slide hole 110.

In addition, a pair of guide holes 240 are formed through the lower plate 200 at intervals in a direction orthogonal to the slider 210.

Further, a guide protrusion 250 protruding upward at a distance from the sliding hole 230 is formed, and the guide protrusion 250 is fitted into a guide groove 330 which is in the form of a long groove (to be described later) to guide the upper plate 300 to be stably linearly movable.

It should be understood that such structures are not limited to the illustrated embodiments, but may be modified in various shapes and forms.

On the other hand, on the lower surface of the upper plate 300, a pair of protruding bars 310, which are fitted into the guide hole 240 and can be linearly reciprocated along the longitudinal direction thereof, are fixed. Then, a knob assembly hole 320 is formed on the upper plate 300 at a point coinciding with the center of the through hole 220, and an arc-shaped pin active hole 322 is further formed around the knob assembly holes 320.

In addition, the guide groove 330 is recessed to a certain depth at a point of the lower surface of the upper plate 300 that coincides with the guide protrusion 250. Herein, the guide groove 330 should also be formed as a long hole, so that the upper plate 300 is smoothly guided without preventing the linear reciprocation.

In addition, the adjustment knob 400 has a dial shape, and a lower end portion of the upper knob 410 is disposed in a state of being inserted into the upper surface of the lower knob 420, and the actuator 430 is assembled through the center. Herein, a lower pin 432 protrudes eccentrically to the lower surface of the lower knob 420, and the lower pin 432 penetrates the pin active hole 322 and then is inserted into the lower pinhole 222 to be caught.

Figure 6:
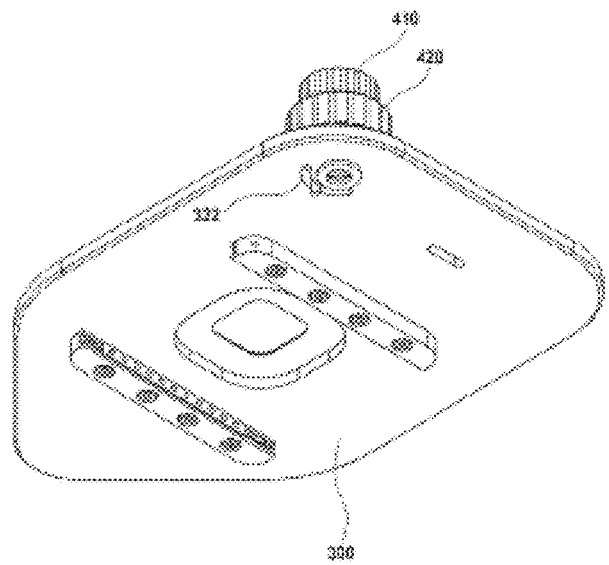
FIGS. 6-9 are exemplary perspective views showing sequential assembly examples of assemblies according to the present invention.
Figure 7:
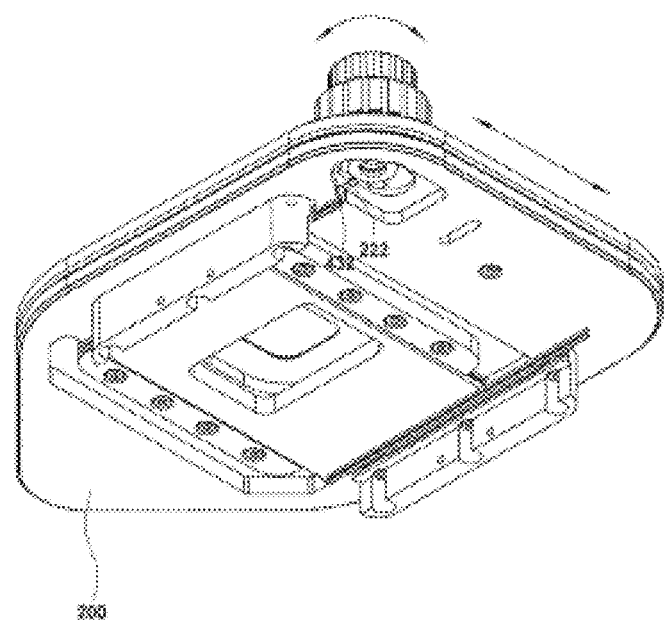

This structure is well shown in FIGS. 6 and 7.

Further, an upper end of the actuator 430 penetrates through the center of the lower notch 420 and is fixed and integrated inside the upper notch 410, and an elliptical cam 434 is formed at a lower end, and the base pin 542 protrudes vertically downward in an eccentric manner from the elliptical cam 434.

Then, the elliptical cam 434 is disposed inside the through hole 220 after passing through the through hole 220, and the base pin 432 is fitted into the base pin hole 120.

Figure 8:
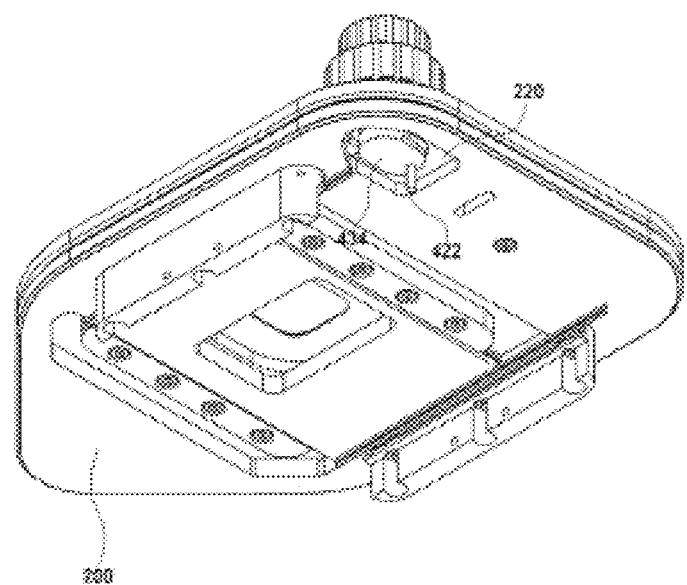
Figure 9:
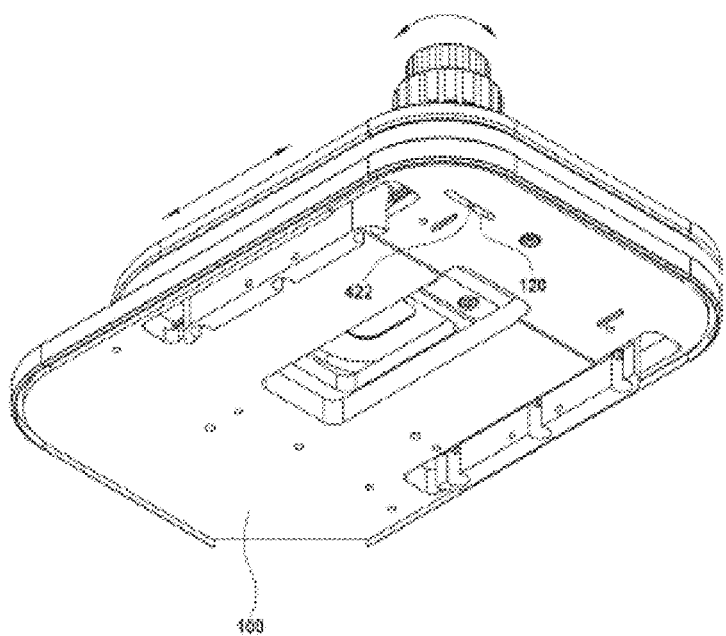

This structure is well shown in FIGS. 8 and 9.

The present invention having the above configuration has the following operational relationship.

First, the lower knob 420 is rotated.

The lower pin 432 can then be rotated without affecting the movement of the upper plate 300 because the pin active hole 322 is arcuate.

In this respect, since the lower end of the lower pin 432 is fixed to a lower pin hole 222 and the slider 210 is fitted into the slide hole 110, the lower plate 200 is maintained in a fixed state with respect to the rotational movement of the lower knob 420 that applies a force in a direction orthogonal thereto.

As such, only the upper plate 300 can be moved. The upper plate 300 can move while rotating about the actuator 430 serving as an axis within the range of the guide groove 330, thereby the guide protrusion 250 can linearly reciprocate within the width of the guiding groove 330. Herein, since the protruding bar 310 is fitted in the guide hole 240, linear motion is possible.

In addition, when the upper knob 410 is rotated, as the base plate 100 is fixed and the base pin 432 is fitted into the base-pin hole 120, the lower plate 200 having mobility in the sliding hole 230 linearly moves along the slide hole 110.

In this case, the upper plate 300 moves together along the lower plate 200.

In this way, by simply operating only one adjustment knob 400, it is possible to move the equipment in the X-axis direction and the Y-axis directions, which is very efficient, increases convenience, reduces manufacturing costs, and eliminates interference.

More specifically, although the friction reducing means has been exemplified above in the present invention, a sliding coating layer may be further formed on a relative friction surface between the protrusion bar 310 and the guide hole 240 and a relative frictional surface between the slider 210 and the slide groove 110.

In this case, the sliding coating layer is formed by applying a coating solution obtained by adding and mixing 15 parts by weight of sodium borohydride, 5 parts of rutin, 2.5 parts in weight of boron nitride, and 5 parts in amount of dammar gum to 100 parts in terms of polycarbonate resin with excellent durability and transparency.

Herein, sodium borohydride reduces friction to increase the inter-plate slip property, Rutin suppresses interfacial separation of the coating layer, and boron nitride is added for maintaining heat dissipation of the coating layer to enhance heat resistance.

In addition, dammar gum, which is a resin obtained from pine wood, suppresses linear expansion, imparts lubricity, and improves slidability on the coating surface.

Figure 10:
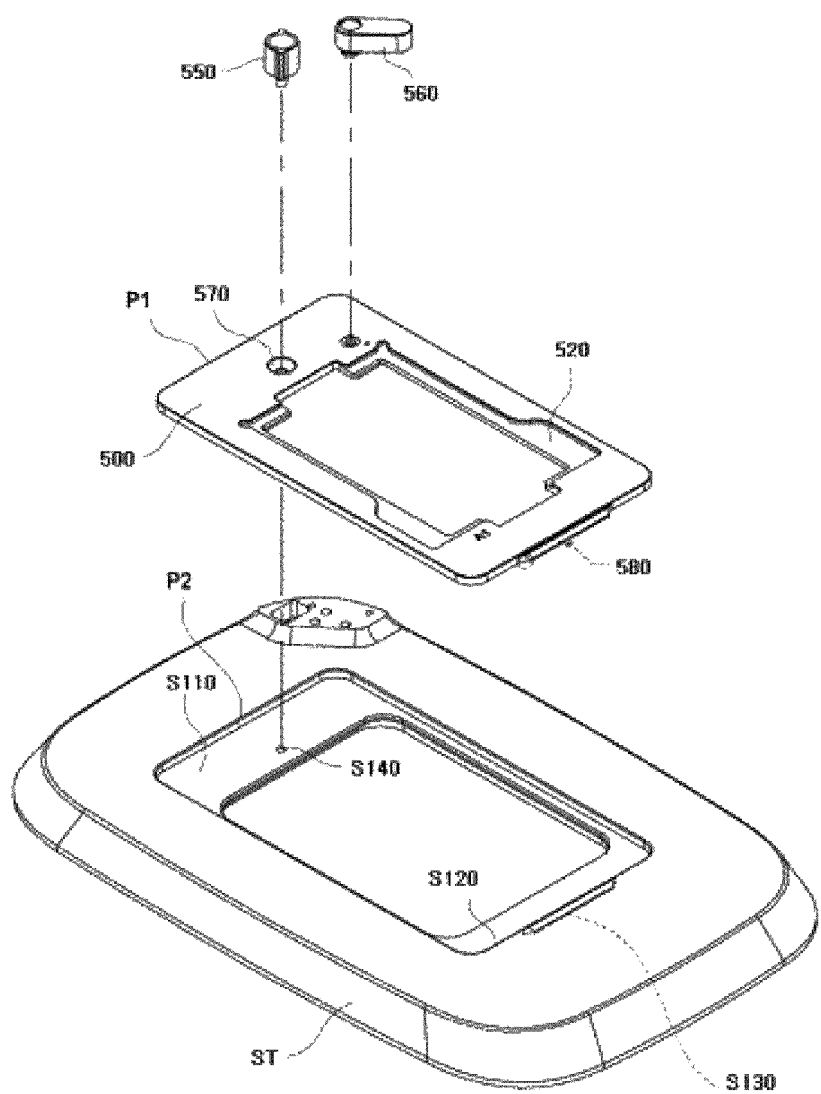
FIGS. 10-12 are exemplary views showing another example of a stage assembly according to the present invention.

In another embodiment according to the present invention, a stage assembly with an assembled vessel holder fixed with a conical screw can also have a vent structure. According to this embodiment, the vessel holder fixed with the conical screw includes a stage (ST) and a vessel holder 500 coupled to the stage (ST), as illustrated in FIG. 10. Herein, a holder mounting groove S110 is formed in the stage (ST) so that the vessel holder 500 can be mounted.

In particular, one side of the holder mounting groove S110 is a reference side surface S120, wherein the reference side surface S120 is a point serving as a reference point to which the vessel holder 500 is fixed. Further, on the reference side surface S120, a wedge insertion groove S130 of a 'L' shape recessed inwardly is formed.

In addition, the vessel holder 500 is a means for bringing a plastic ware of various forms for cell observation into close contact with the upper surface of the stage (ST). For this, the vessel holder 500 is provided with a vessel mounting part 520. In this case, the vessel mounting part 520 may have various shapes depending on the shape of the plastic ware. In addition, one upper surface of the vessel holder 500 is provided with a presser 560 for unmovably fixing the plastic ware seated on the vessel mounting part 520.

The presser 560 is configured to be axially fixed to the upper surface of the vessel holder 500 to be able to pivot within a certain angular range, and is rotationally moved so that the presser 560 is removed and rotated to press the side surface when the plastic ware is seated on the vessel mounting part 520.

In addition, a screw hole 570 is formed at a distance from the presser 560, and a protruding wedge 580 to be inserted into the wedge insertion groove S130 is provided on an end surface of an end portion opposite to the end portion on which the screw hole 570 is formed.

Figure 11:
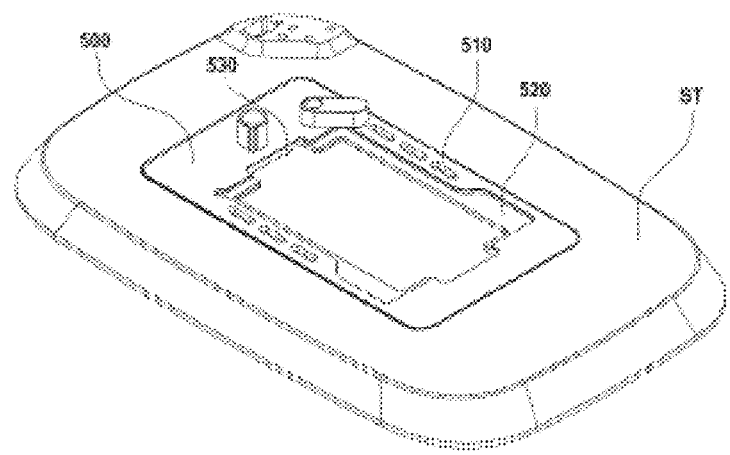
Figure 12:
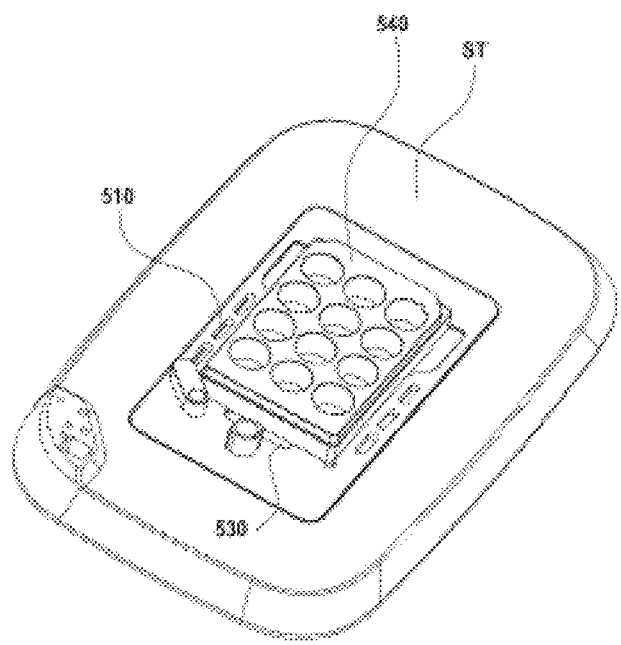

Further, as illustrated in FIGS. 11 and 12, a stage assembly in which the vessel holder 500 is assembled to the stage (ST) can have a vent structure for preventing condensation according to the present invention. For example, as shown, a plurality of through-flow holes 510 are formed vertically at intervals in the longitudinal direction on both sides of the width direction of the vessel holder 500, which communicate with a space between the vessel mounting part 520 and the upper surface of the vessel holder 500 to allow air flowing through the flow path to wrap and flow around the slope of a vessel 540 mounted on the vessel holder 500 so as to maintain a temperature similar to that of ambient air, thereby minimizing a temperature difference between portions of the vessels 540 and preventing dew condensation. In this case, the flow holes 530 through which air can flow can be further formed on both end surfaces in the width direction of the vessel holder 500 orthogonal to the through-flow hole 510, thereby making the air flow smoother.

As such, it should be understood that the provision of the vent structure can be variously modified while the basic concept remains the same even if the forms and shapes of the stage assembly are changed.

DESCRIPTION OF REFERENCE NUMERALS

100 base plate
200 lower plate
300 upper plate
400 adjustment knob

What is claimed is:

1. A stage assembly having a vent structure for preventing condensation, comprising:
   a base plate;
   a lower plate assembled on an upper surface of the base plate;
   an upper plate assembled on an upper surface of the lower plate;
   an intake passage recessed on an upper surface of the upper plate and provided to communicate with a central hole; and
   an intake fan installed inside a stage below the base plate and configured to suck outside air into the inside through the intake passage and release the air through a vent.

2. The stage assembly of claim 1, further comprising:
   an adjustment knob disposed on one side of the upper plate,
   wherein the adjustment knob is assembled and installed to pass through the lower plate and the base plate; and
   wherein the adjustment knob comprises:
   a lower knob for linearly moving the upper plate, and
   an upper knob for simultaneously moving the upper plate and the lower plate in a direction orthogonal to a linear movement direction of the upper plate.

3. The stage assembly of claim 1,
   wherein the intake passage has a shape of at least one selected from the group consisting of a cross shape, a horizontal straight shape, a vertical line shape, a curved shape, and a coil shape, or of a combination of at least two selected therefrom; and
   wherein the intake passage has a U-shape, a V-shape or a semicircular shape based on a cross section.

4. The stage assembly of claim 1,
   wherein a pair of slide holes are formed on both sides in the width direction of the base plate;
   wherein a base pin hole having a long hole shape in the width direction is formed on the base plate coinciding with a point where the adjustment knob is installed;
   wherein on a lower surface of the lower plate,
      a slider that can be inserted into the slide hole and be moved is arranged,
      a through hole larger than the base pin hole and a lower pin hole extending vertically from the through hole are formed at a position corresponding to the base pin hole, and
      a pair of guide holes are formed perpendicular to the slider;
   wherein on a lower surface of the upper plate,
      a protruding bar that can be inserted into the guide hole and moved is arranged, and
      a knob assembly hole and a pin active hole having an arc-shape are formed at a position coinciding with the center of the through hole with a distance from each other; and
   wherein the stage assembly comprises an actuator penetrating the center of the lower knob and integrally fixed to the upper knob, wherein a lower pin fixed to the lower pin hole after passing through the pin active hole is formed on a lower surface of the lower knob, and a base pin fixed to the base pin hole after passing through the through hole is provided at a lower end of the actuator while being eccentric.

5. The stage assembly of claim 4,
   wherein the base pin is eccentrically fixed to the lower end of the actuator.

6. The stage assembly of claim 4,
   wherein a fixing hole is formed on the base plate;
   wherein a sliding hole having a long hole shape in a longitudinal direction of the lower plate is formed at a position corresponding to the fixing hole of the lower plate; and
   wherein a fixing device is bound to the fixing hole and the sliding hole.

7. The stage assembly of claim 4,
   wherein a guide protrusion protrudes from the upper surface of the lower plate; and
   wherein a guide groove having a long groove shape in a width direction of the upper plate is recessed in a lower surface at a position corresponding to the guide protrusion of the upper plate.

* * * * *